United States Patent [19]
Huffaker et al.

[11] 3,785,039
[45] Jan. 15, 1974

[54] METHOD OF FABRICATING CONTINUOUS PRODUCT FROM MOLDED SECTIONS

[75] Inventors: James E. Huffaker, Kingsport, Tenn.; Ernest L. Myers, Hiltons, Va.; Brian D. Dillon; Cecil W. Dolen, both of Kingsport, Tenn.

[73] Assignee: Eastman Kodak Company, Rochester, N.Y.

[22] Filed: June 27, 1972

[21] Appl. No.: 266,581

Related U.S. Application Data

[62] Division of Ser. No. 42,106, June 1, 1970, Pat. No. 3,695,573.

[52] U.S. Cl. .................................. 29/428, 29/463
[51] Int. Cl. ............................................. B23p 19/00
[58] Field of Search ............... 29/428, 526, 463; 249/219, 176, 142; 264/255, 219; 425/364, 370, 373 X

[56] References Cited
UNITED STATES PATENTS

| | | | |
|---|---|---|---|
| 2,494,642 | 1/1950 | Case et al. | 425/370 |
| 2,591,564 | 4/1952 | Lind | 29/428 |
| 3,150,576 | 9/1964 | Gewiss | 425/373 X |
| 3,241,182 | 3/1966 | Kessler | 425/373 |
| 3,258,812 | 7/1966 | Willy | 425/373 X |
| 3,290,421 | 12/1966 | Miller | 249/176 X |
| 3,391,424 | 7/1968 | Drossbach | 425/370 X |
| 3,482,326 | 12/1969 | Brewster | 249/176 X |

*Primary Examiner*—Charlie T. Moon
*Attorney*—Daniel J. Hanlon, Jr. et al.

[57] ABSTRACT

A mold for casting solidifiable materials and method of fabricating a continuous belt from molded sections is disclosed. In the mold, a plurality of apertures are provided in a special pattern, each of which is adapted to receive a core member. The core members are easily removable. Removable end plates are provided which enable the pattern to be continued to the very edge of the mold. A continuous belt mold is fabricated by butting and connecting edges of molded sections.

1 Claim, 5 Drawing Figures

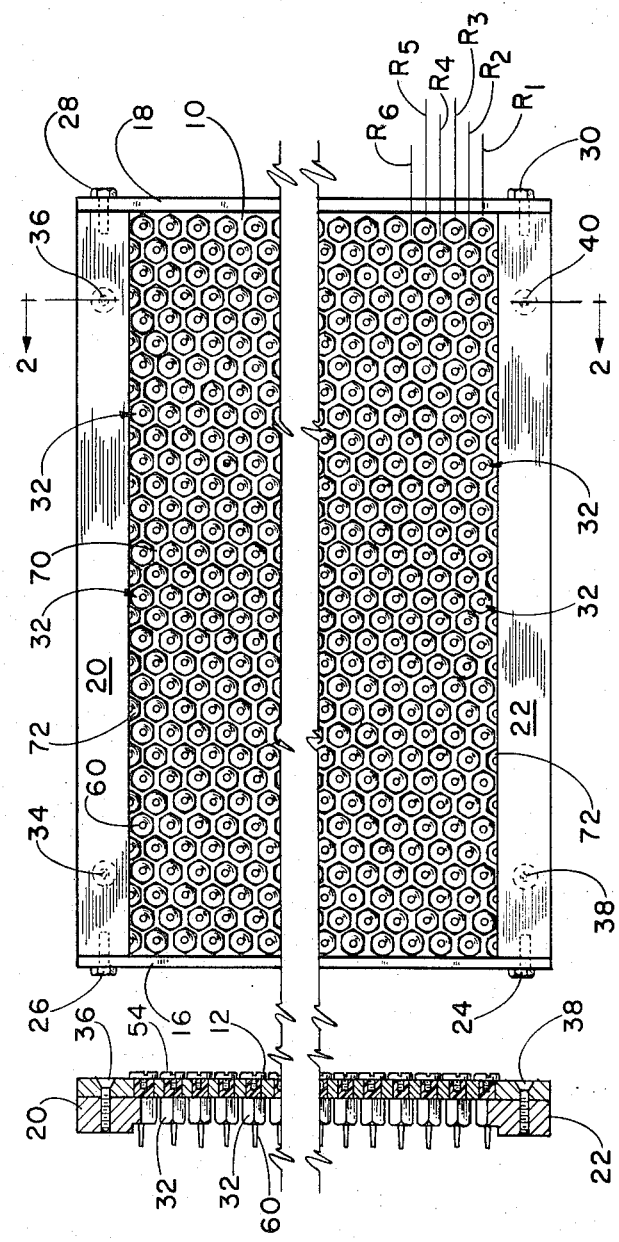

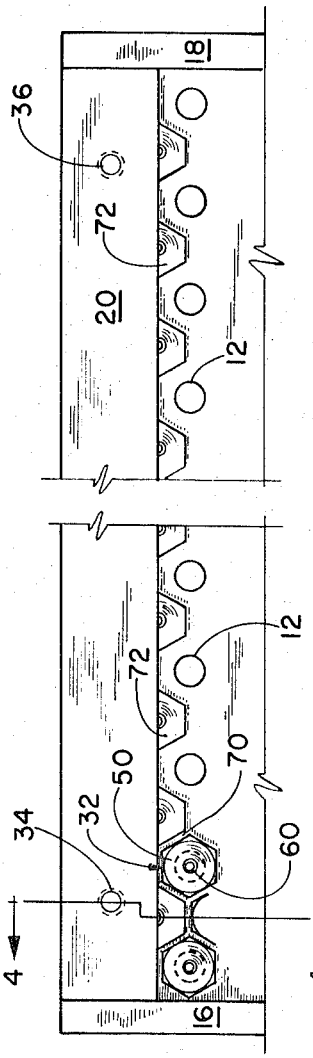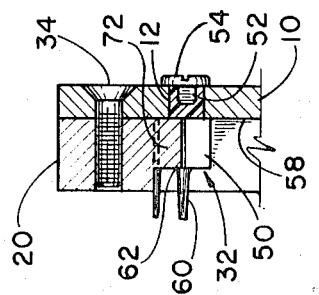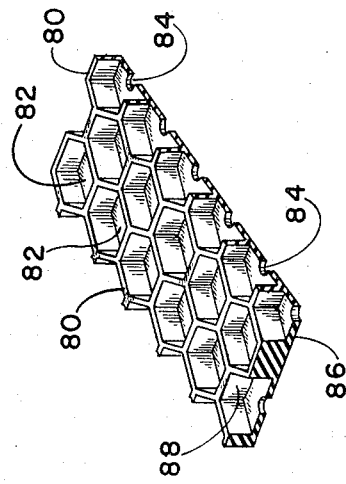

METHOD OF FABRICATING CONTINUOUS PRODUCT FROM MOLDED SECTIONS

This is a division, of application Ser. No. 42,106 filed June 1, 1970, now U.S. Pat. No. 3,695,573.

This invention relates generally to molds for casting materials and thereafter fabricating a continuous product therefrom. More particularly, this invention relates to a male mold from which a female mold section is made, and the fabrication of a continuous female mold from cast sections thereof.

The casting mold according to the present invention is useful in the manufacture of continuously molded sheet material, such as for example, a continuous sheet of thermoplastic material molded into a three-dimensional product having a multiplicity of closely spaced cells formed therein with side walls extending substantially perpendicular to the plane of the product.

In the past, much difficulty has been encountered in such molds due to such requirements as durability, flexibility, economy, and the like. For producing a continuous product on and endless belt-type mold, the mold must have the flexibility and durability to flex many times in passing around rolls over which it is entrained. In such flexing, it is imperative that fractures of the mold must not occur, else a defect in the molded material will occur at the point of fracture. Furthermore, a major problem occurs in attempting to fabricate a continuous mold, because if it is attempted in a continuous casting operation, the mold itself would necessarily have to be flexible. In casting sections of the mold to subsequently be pieced together, difficulty has been encountered in exact matching of the pattern at the joints of the individual sections.

In the molding of patterns of delicate features, problems have also been encountered in the incorporation of the delicate features into the mold. When the pattern is repetition of a multiplicity of intricate details, the problem also is multiplied. Intricate details should not be too difficult or costly to incorporate into the mold. Furthermore, the possibility of damage to the mold details must be considered, and if such occurs, replacement of individual sections must be economical and relatively simple.

The mold must have the ability to withstand relatively high molding temperatures as well as numerous and rapid temperature fluctuations without undue dimensional changes or fracturing. Moreover, the intricate details of pattern must be precision-made and fitted so there is no possibility of flashing which might make the molded article difficult to strip from the mold.

The present invention provides a male mold for casting female sections of a second production mold of intricate repeating patterns which can be pieced together to make a durable, flexible continuous pattern with substantially no interruption in the pattern. The present invention further provides a method of piecing these sections together to form a continuous belt-type mold.

According to the present invention, a base plate is drilled to form a plurality of parallel rows of apertures, the apertures in each row being substantially equally spaced and the apertures in alternate rows being staggered with respect to the apertuers in adjacent rows and in general alignment with the apertures in alternate rows thereby providing a regular pattern of apertures. Core elements are placed on the base plate with an integral projection of each core extending into the aperture. Fasteners are then placed at each aperture, on the opposite side of the base plate to firmly hold each core in place. The pattern of cores extending from the other side of the base plate thus assumes the pattern of the apertures described above. This type of mold results in much flexibility of changing patterns, or details of the mold when desired by permitting the cores and end plates to be changed as desired.

Also, according to the present invention, end plates are connected to the edges of the base plate to form walls around the sides of the base plate to prevent flow of casting material off the base plate. At least one of these end plates includes a plurality of interior projections to form one half of a row of cores to facilitate matching abutting sections of the product to be cast thereon. Any number of the sides of the base plate may be provided with such end plates, depending upon the number of sides of the cast product which must be matched and abutted to form a continuous pattern.

Preferably, the individual cores are of an inexpensive material such as plastic, for example, polypropylene or nylon. The cores preferably have some degree of flexibility and are precision-molded. The cores are tightened against the base plate by the fasteners, which may preferably be self-threading screws. Such cores may then be replaced or repaired by simple operation. The cores are tightened by means of the screws so that no flashing will occur between the base plate and the bottom surface of the cores.

In the drawings which illustrate a specific embodiment of the invention;

FIG. 1 is a plan view of a casting mold according to our invention;

FIG. 2 is a section view taken substantially along line 2—2 of FIG. 1;

FIG. 3 is an enlarged plane view of the end plate of the casting mold; plan

FIG. 4 is a section view taken along line 4—4 of FIG. 3; and

FIG. 5 is a partial plan view of sections of a continuous belt molded in accordance with this invention.

Referring to the drawings, there is illustrated one embodiment of the invention including a rectangular base plate 10 having a multiplicity of holes 12 drilled therein in a regular pattern. The base plate may be of a material such as metal having the ability to withstand molding temperatures in the order of 300° F. Holes 12 are formed in a plurality of parallel, equally spaced rows $R_1$, $R_3$, $R_5$, and $R_n$, each having a plurality of equally spaced holes 12. Alternate rows $R_2$, $R_4$, $R_6$ and $R_{n+1}$ are also equally spaced and contain a plurality of equally spaced holes 12 therein. The rows of holes, and holes within adjacent rows are staggered so that a regular pattern of equally spaced holes are provided in base plate 10. In the embodiment illustrated, two opposite ends are provided with plain end bars 16 and 18 defining boundaries of the casting areas. End plates 16 and 18 are secured to opposite end plates 20 and 22 by studs 24, 26, 28 and 30. Opposite end plates 20 and 22 are secured to base plate 10 by means of studs 34, 36, 38 and 40.

Throughout the entire span between end plates 16, 18, 20 and 22, a plurality of plugs or core members 32 are provided so as to result in a specific design or configuration for the molding surface. The shape of the core members 32 are best shown in FIGS. 3 and 4. The core members 32 include a body portion 50 of hexagonal geometric shape when viewed in plan, and of upwardly and inwardly tapering shape when viewed in elevation. The body portion 50 is provided with a shank 52 centered at its base for extending through the aperture 12 in base plate 10 for connecting to a fastener, illustrated as being a self-threading screw 54. By firmly tightening the screw 54, the shank 52, and thus the base of the body 50 is caused to be pulled into tight contact with surface 58 of plate 10, thereby minimizing the possibility of a space existing between surface 58 and the base of the body portion 50. This construction virtually eliminates flashing around the base of the body portion 50.

The core member 32 also includes an axially extending, upwardly tapering pin 60 for introducing an aperture in the belt section to be molded. The pin 60 is slightly flexible, and joins the body portion 50 in a slight circumferential flare at 62. Flexibility of pin 60 and the flare at 62 greatly aids in stripping a molded object from the base plate, and prevents rupturing of intricate details of the molded object. Each of the core members 32 are set in angular alignment, so as to form an interconnected network of voids 70 to be filled in by the molding material. The core members 32 may conveniently be a durable, injection-molded plastic material.

Significant advantages are realized by the use of specially designed end plates 20 and 22. These end plates are provided with spaced half-sections of core members 72 at equal intervals across two sides of the mold in the embodiment illustrated. The half-sections adjacent row $R_1$ are mirror images of the closest half-sections of row $R_2$ and provide continuity of the voids 70 up to the very edge of the mold. Thus, when molded sections are placed in abutting relationship, the pattern is exactly continuous. Of course, any number of the ends may be made by the use of such an end plate according to the design of the belt to be molded. For example, if the belt is to be two sections in width, three sides will be molded with the special end plates. If the belt is only to be a single section in width, it is only necessary for the special end bars to be used on two ends.

The parts of the casting mold described herein are readily removable and replacable so that damaged parts can be replaced with very little expense and inconvenience. Also, easy interchangeability is permitted so that the pattern of the casting can easily be changed. For example, the core elements 32 and the end plates 20 and 22 can all be changed to result in a new pattern if desired.

In FIG. 5, there is illustrated a partial perspective view of a production mold made in accordance with this invention. This mold is formed with an interconnected grid of wall portions 80 generally perpendicular to the plane of the top and bottom of the mold. The wall portions 80 define the boundaries of adjacent cells 82 and are formed by the continuous voids 70 of the casting mold. The cells 82 are formed by the core elements 32, and the holes 84 are formed by pins 60 or the core elements. From FIG. 5, it may be seen that the border 86 of the mold is formed by half-sections of cells 88, by means of the spaced half-sections of the core members 72. Another section of mold, formed in a similar manner, may be exactly matched to this edge 86 to form a continuous pattern of the interconnected grid 80 and cells 82.

EXAMPLE

SILASTIC E RTV Mold-Making Rubber, a silicone rubber product of Dow-Corning Corporation, is cast to make a female production hexagon structured mold as follows:

1. Six pounds of rubber is mixed with 0.6 pounds (10 percent) thinner and blended thoroughly with a spatula, taking care not to whip air into the blend.
2. A solution of 5 to 15 percent petroleum jelly in methylene chloride is poured over a metal and polypropylene core male mold, insuring all cores have been wet by the solution. The mold is then drained thoroughly, leaving a thin film of petroleum jelly on all mold surfaces. The excess methylene chloride is allowed to evaporate (within one-half hour at room temperature, or it may be flashed off in an oven at 130°–160° F. in 3 to 5 minutes).
3. The casting mold is then set in a large oven/vacuum chamber and leveled to insure even flow of the silicone rubber when poured in.
4. The 0.6 pounds of rubber thinned with 10 percent inert thinner ("SILASTIC RTV THINNER," a product of Dow-Corning Corporation) is then catalyzed with 6 pounds of SILASTIC E RTV Catalyst, a product of Dow-Corning Corporation, in the same manner the thinner was mixed in. This solution will remain pourable for up to 2 hours before extensive curing takes place.
5. The thinned, catalyzed rubber is placed in vacuum desiccators (because of the amount of rubber and the size of the desiccators, two are used for this application), and 28–30 inch Hg vacuum is drawn to de-air the solution.

Immediately, the rubber expands to 4 to 5 times its original volume as the initial air is drawn off, then the level of the solutions falls to its original height. This process takes 4 to 6 minutes. The rubber is then sufficiently deaerated to be poured.

6. The rubber is poured into the casting mold in the oven (not turned on at this point), taking care to completely cover all core elements to a level even with the half-hexagon cut end plates. Two steel plates, held flush to the base plate with C-clamps, retain the rubber on the other two mold edges.
7. The top is placed on the oven/vacuum chamber, and the rubber in the mold is deaerated again with 27–29 inch vacuum. The vacuum is pulled for 10 to 15 minutes until bubbles appear all over the rubber surface. The oven is then vented, collapsing the bubbles and inducing flow into the voids where the air comes out of solution. vacuum is pulled again for 15 minutes and then the chamber is vented.
8. Heaters in the oven/vacuum chamber are now turned on, with a thermostat set at 160° F. The air pressure is atmospheric. The rubber will cure completely in 2 hours. The heaters are turned off, the oven plate (top) is raised, and the mold is allowed to cool.
9. When the mold has cooled sufficiently that it may be picked up, it is then taken to a freezer at 0°F. and left for 1 to 2 hours to reach thermal equilibrium. It is then removed and the silicone rubber production female mold is pulled gently from the casting mold. Silastic rubber adhesive will repair any tears which may occur.

The invention has been described in considerable detail with particular reference to certain preferred embodiments thereof, but it will be understood that variations and modifications can be effected within the spirit and scope of the invention.

We claim:

1. The method of fabricating a continuous molding belt having a substantially regular pattern of depressions defined by surrounding side walls and land areas of said walls defining an interconnected grid, said method comprising the steps of:

a. producing sections of said belt in a mold having a plurality of parallel rows of core members, the core members in each row being substantially equally spaced, the core members in alternate rows being staggered with respect to the core members in adjacent rows and in general alignment with the core members of alternate rows, thereby providing a regular interconnected network of spaces between the core members, at least one end of said mold comprising a row of spaced half-core members in staggered relationship with the core members of the adjacent first row of core members, b. butting ends of at least two of said sections together so that the joint extends substantially along a center line of a row of core members, and c. connecting said sections at said butt joints to form an endless belt.

* * * * *

PO-1050
(5/69)

UNITED STATES PATENT OFFICE
CERTIFICATE OF CORRECTION

Patent No. 3,785,039         Dated January 15, 1974

Inventor(s) James E. Huffaker et al

It is certified that error appears in the above-identified patent and that said Letters Patent are hereby corrected as shown below:

The assignee should read -- Kimberly-Clark Corporation --.
Column 1, line 64, "apertuers" should read -- apertures --.
Column 2, line 37, "plane" should read -- plan --.
Column 2, line 38, delete "plan".
Column 4, line 53, "vacuum" should read -- Vacuum --.

Signed and sealed this 2nd day of July 1974.

(SEAL)
Attest:

EDWARD M. FLETCHER,JR.          C.MARSHALL DANN
Attesting Officer                Commissioner of Patents